UNITED STATES PATENT OFFICE.

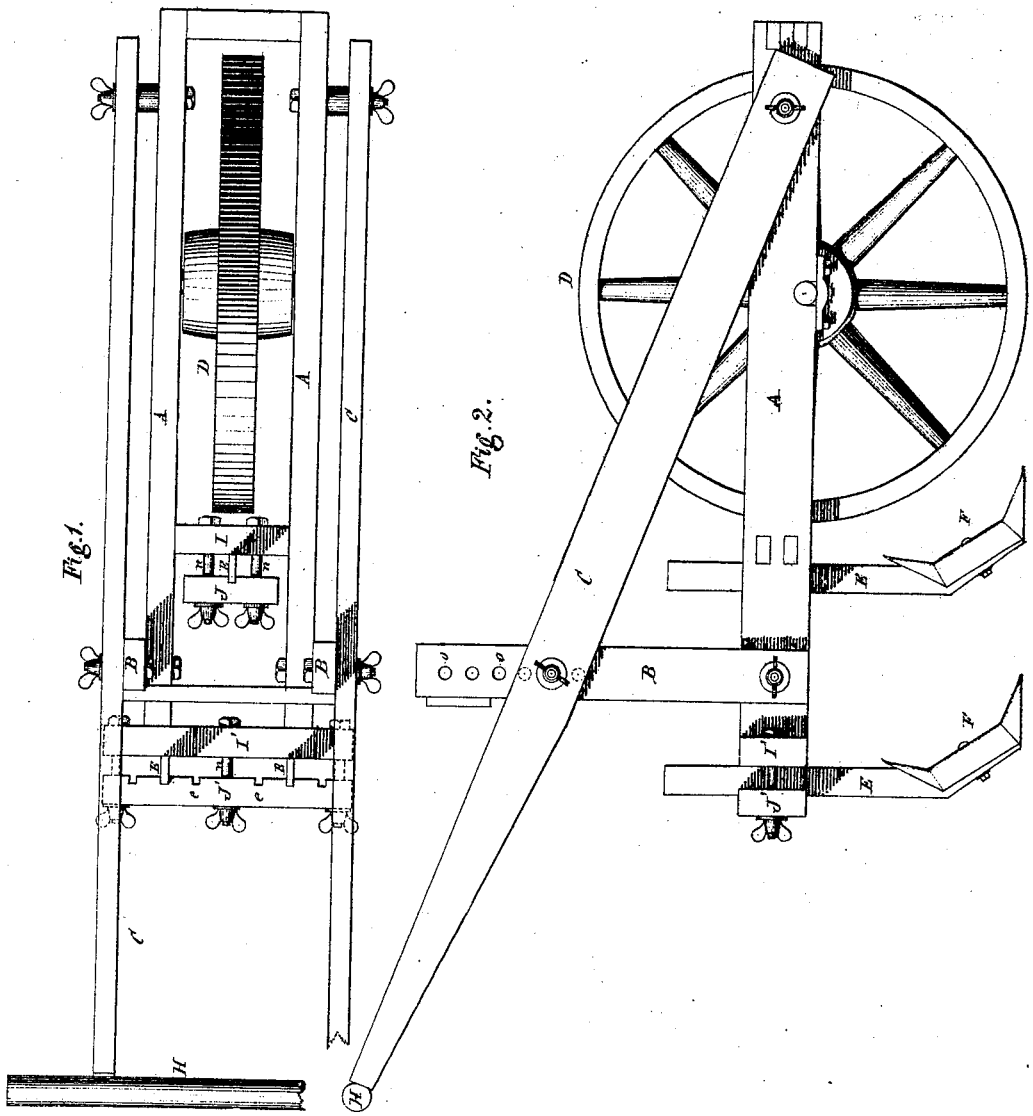

LUMAN L. BEACH, OF MOUNT UPTON, NEW YORK.

IMPROVEMENT IN HAND-CULTIVATORS.

Specification forming part of Letters Patent No. 98,337, dated December 28, 1869.

*To all whom it may concern:*

Be it known that I, LUMAN L. BEACH, of Mount Upton, in the county of Chenango and State of New York, have invented certain new and useful Improvements in Hand-Cultivators; and I do hereby declare that the following is a full, clear, and exact description thereof, reference being had to the accompanying drawings, making part of this specification, and to the letters of reference marked thereon.

Like letters indicate like parts wherever they occur.

To enable others skilled in the art to construct and use my invention, I will proceed to describe it.

My invention relates to hand-cultivators such as are used by those engaged in growing garden vegetables, berries, and similar crops.

The invention consists in a novel manner of constructing the implement, whereby it is made very simple and cheap, and can be adjusted, as desired, to suit the circumstances of the case, as hereinafter more fully explained.

Figure 1 is a top plan view, and Fig. 2 is a side elevation.

To construct my improved implement, I make a rectangular frame, A, with two cross-bars, I and I', at its rear portion, and mount its front end on a wheel, D.

To the frame A, near its rear end, on each side, I secure an upright, B, provided with a series of holes, o, near their upper ends, as shown in Fig. 2. I then provide two bars, C, somewhat longer than the frame A, and pivot them—one on each side—near the front end of frame A, from whence they extend back alongside of the uprights B, to which they are fastened by bolts, as represented in Figs. 1 and 2, the bars C being united at their rear end by a cross-bar, H, which is made round for convenience in holding it.

By means of the holes o in the uprights B, the handle H can be raised or lowered at will, and thus adjusted to suit men or boys, and also according to the quality or condition of the soil, it being necessary to lower the handles in case the soil is heavy or compact, so as to apply the propelling-power more nearly in a direct line and to greater advantage.

I provide the implement with three shares, F, two at the rear and one a short distance in front of them, as shown in Fig. 2. These shares are made double-ended, with a point at each end, and are secured to their standards by a bolt passing through the center of each, so that they can be readily turned either end down. These shares may be made with one end or point of one form or style and the other of another form, and thereby adapt the implement to different purposes, or to the cultivation of plants at their various stages of growth. These shares F, I attach to standards E, which consist of pieces of timber of suitable size, their main portion being straight, while their lower portion is bent forward, as represented in Fig. 2, at an angle to adapt them to receive the shares E. These standards I secure to the frame by clasping them between the fixed cross-bars I I' and loose bars J and J', as represented in Fig. 1. The loose bars are secured to the stationary cross-bars I I' by means of bolts n, which have thumb-nuts on their outer ends, to be tightened or loosened at pleasure, for the purpose of adjusting the standards at such heights as may be required.

The bars J and J' are each provided with a notch or gain, e, cut in their front face, to receive the standard E and hold it firmly in position, as shown in Fig. 1. The rear bar, J', has a series of these notches e cut in it, for the purpose of adjusting the shares laterally, as may be desired.

It will be observed that nearly the whole of the implement is made of plain straight bars of wood, with bolts of uniform character, which can be bought, ready made, at almost any hardware shop, and that thus I provide an implement that is extremely simple and cheap, that can be made by any ordinary mechanic, and which, at the same time, is well adapted to the purposes for which it is intended.

I am aware that hand-cultivators have heretofore been made, and I do not claim such, broadly; but,

Having thus described my invention, what I claim is—

1. The implement consisting of the frame A, with the cross-bars I and I', with the uprights B, and the adjustable handle C H and wheel D, all constructed and arranged substantially as described.

2. The combination of the cross-bars I I', adjustable bars J J, provided with the notches e, and standards E, when secured by the bolts n, as set forth.

LUMAN L. BEACH.

Witnesses:
    JACOB STOWELL,
    ADAM D. DYE.